United States Patent Office.

ANTHONY PIERCE, JR., OF NEW BEDFORD, MASSACHUSETTS.

TREATING IMPURE ZINC.

Specification forming part of Letters Patent No. 44,112, dated September 6, 1864.

*To all whom it may concern:*

Be it known that I, ANTHONY PIERCE, Jr., of New Bedford, in the county of Bristol and State of Massachusetts, have invented a new and useful Process for Treating Refuse or Impure Zinc; and I do hereby declare that the following is a description of my invention sufficient to enable those skilled in the art to practice it.

This invention relates principally to the treatment of the refuse zinc of iron-galvanizing works with reference to utilizing the zinc, the invention consisting in the process employed to separate the zinc from the iron.

In coating iron plates with zinc in the manufacture of what is generally known as "galvanized iron" the zinc remaining after the treatment of a large amount of iron contains a very considerable percentage of impurities, mostly in the form of iron or oxide of iron, and much zinc is deteriorated by the presence of the iron, so as to have a value of not more than thirty-three per cent. of the value of the zinc before the galvanizing process. By my treatment most of the zinc is recovered in a pure or nearly pure condition. To separate the zinc the metal is melted in a suitable vessel and allowed to cool until the metal at the bottom of the vessel begins to thicken. The supernatant and more liquid metal is then poured off and will be found to be free or nearly free from the iron, which will have sunk from its greater specific gravity and solidified with the lower portion of the metal. When the metal heated has contained ten per cent. of iron I succeed in obtaining by this process a large proportion of zinc containing less than one per cent. of iron, and having the same value as the zinc possessed before the galvanizing process; and it will be readily understood that it is an object of much importance to save this zinc by a process so simple and inexpensive as the one described.

I claim—

The process, substantially as above described, for treating refuse or impure zinc with reference to the separation of the zinc from the iron contained in the metal.

In witness whereof I have hereunto set my hand this 26th day of July, A. D. 1864.

ANTHONY PIERCE, JR.

Witnesses:
 HENRY R. TUCKER,
 WM. L. GERRISH, Jr.